United States Patent [19]
Murano et al.

[11] Patent Number: 5,823,686
[45] Date of Patent: Oct. 20, 1998

[54] CHAIN WITH OILLESS ANTIFRICTION BEARING

[75] Inventors: Tetsuya Murano; Hiroshi Nishimura, both of Osaka-fu, Japan

[73] Assignee: Tsubakimoto Chain Co., Osaka-fu, Japan

[21] Appl. No.: 692,258

[22] Filed: Aug. 5, 1996

[30] Foreign Application Priority Data

Aug. 7, 1995 [JP] Japan ................................. 7-200919

[51] Int. Cl.$^6$ ................................................ F16C 33/66
[52] U.S. Cl. ................................... 384/492; 384/463
[58] Field of Search .................................. 384/492, 543, 384/548, 553, 565, 463

[56] References Cited

U.S. PATENT DOCUMENTS

| | | | |
|---|---|---|---|
| 3,425,759 | 2/1969 | Schwarzschild | 384/492 |
| 3,441,327 | 4/1969 | Peter et al. | 384/463 |
| 3,764,188 | 10/1973 | Suska | 384/463 |
| 3,848,937 | 11/1974 | Harder, Jr. | 384/34 |

FOREIGN PATENT DOCUMENTS

| | | | |
|---|---|---|---|
| 1169898 | 1/1959 | France | 384/463 |
| 37-9104 | 7/1962 | Japan | |
| 2105607 | 8/1990 | Japan | |
| 2246402 | 4/1994 | United Kingdom | |

*Primary Examiner*—Thomas R. Hannon
*Attorney, Agent, or Firm*—Dann, Dorfman, Herrell and Skillman; Henry H. Skillman

[57] ABSTRACT

An oilless antifriction bearing capable of supporting a large load, not requiring maintenance work for lubrication and having high durability comprises an outer ring (1) having an outer-ring race, an inner ring (2) having an inner-ring race, a plurality of metallic rolling elements (3), and a plurality of polyethylene rolling elements (4). The plurality of metallic rolling elements (3) and the plurality of polyethylene rolling elements (4) are arranged circumferentially alternately in the space between the outer-ring race of the outer ring (1) and the inner ring race of the inner ring (2). The polyethylene rolling elements (4) are interposed between the metallic rolling elements (3) to prevent the direct contact between the metallic rolling elements (3), making lubrication unnecessary. The polyethylene rolling elements allow free foreign matter including abrasive particles produced by the abrasion of the unlubricated steel cylindrical rollers and external dust particles to become embedded in the polyethylene to entrap the free foreign matter.

11 Claims, 2 Drawing Sheets

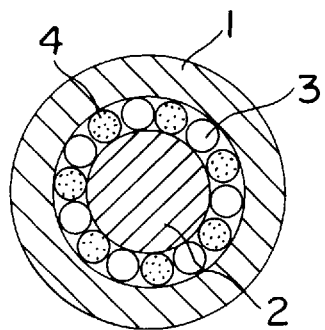
F I G. 1
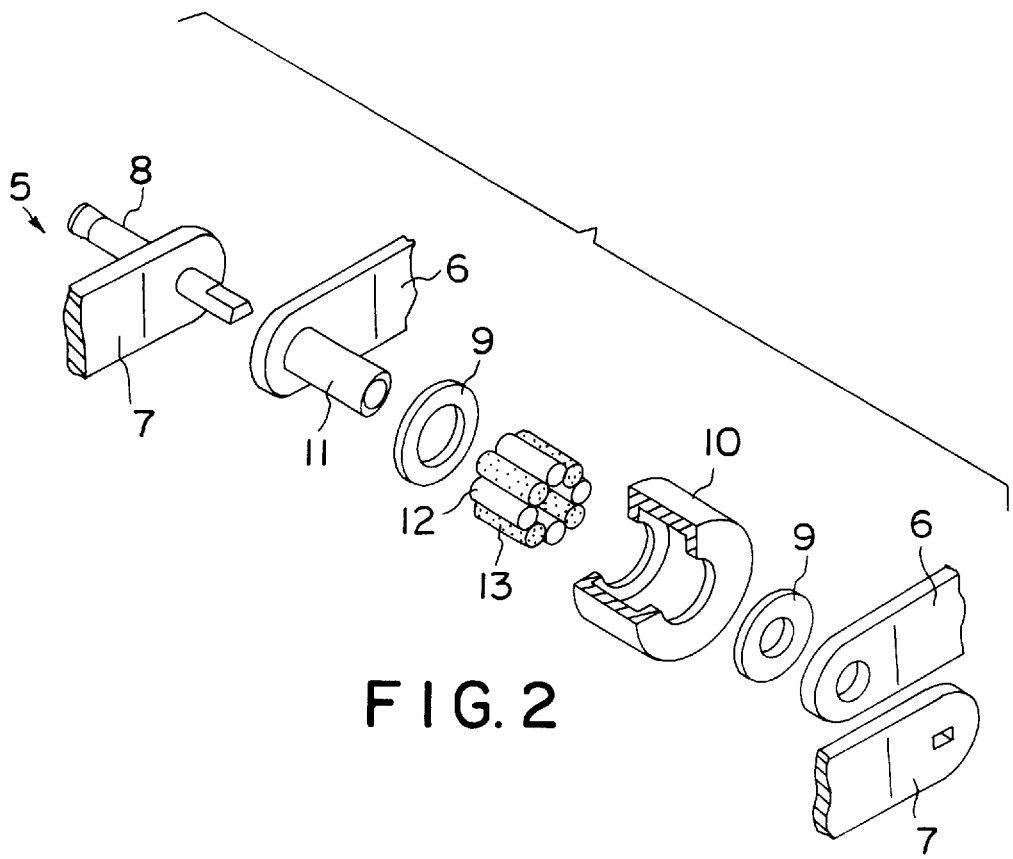
F I G. 2

CHAIN WITH OILLESS ANTIFRICTION BEARING

FIELD OF THE INVENTION

The present invention relates to an oilless antifriction bearing not requiring lubrication with grease or oil and, more particularly, to an oilless antifriction bearing suitable for use in conveyor chains or the like.

BACKGROUND OF THE INVENTION

A conventional antifriction bearing has metallic rolling elements, such as steel balls or steel rollers, and needs a lubricant, such as grease, to prevent the direct contact between the metallic rolling elements. Troubles including seizure occurs in the antifriction bearing having the metallic rolling elements due to direct rolling contact between the metallic rolling elements if the lubricant is deteriorated or depleted. Therefore, the conventional antifriction bearing needs maintenance work for replenishing the same with the lubricant.

An antifriction bearing disclosed in JP-B No. 37-9104 comprises an outer ring, an inner ring, steel rolling elements each provided with a hole filled up with a lubricant, and synthetic resin rolling elements of a synthetic resin, such as a polyamide resin, a fluorocarbon resin, a phenolic resin, a polyoxymethylene resin or a polycarbonate resin. The steel rolling elements and the synthetic resin rolling elements are arranged alternately in the space between the outer and the inner ring. This previously proposed antifriction bearing is designed so that the lubricant contained in the bores of the steel rolling elements is caused to leak for lubrication by centrifugal force at the least necessary rate when a rotating member supported on the antifriction bearing rotates at a high rotating speed to suppress increase in the temperature and frictional resistance of the antifriction bearing.

An antifriction bearing disclosed in JP-U No. 2-105607 comprises component parts all of which are formed of resins. The self-lubricating abilities of the resins forming the component parts make lubrication unnecessary.

However, the self-lubricating ability of the synthetic resin rolling elements, which are made of a polyamide resin, polyoxymethylene resin or a polycarbonate resin, of the antifriction bearing disclosed in JP-B 37-9104 is deficient, and roll-shaped abraded particles, in which crystalline resins are abraded, are produced and interfacial slip occurs if the steel rolling elements are deficient in the lubricant. The rolling elements made of a thermosetting resin, such as a phenolic resin or the like, produce abraded particles due to local rupture. The rolling elements made of a fluorocarbon resin have a relatively low strength.

In the antifriction bearing disclosed in JP-U No. 2-105607, the resin rolling elements have a relatively low strength and the antifriction bearing has limited uses where the antifriction bearing undergoes only relatively small load. The resin rolling elements are ill-matched with each other and the resin rolling elements fail to rotate properly if the resin rolling elements come into direct contact with each other.

SUMMARY OF THE PRESENT INVENTION

Accordingly, it is an object of the present invention to provide an oilless antifriction bearing capable of solving those problems in the foregoing conventional antifriction bearings and of supporting a large load, not requiring maintenance work for lubrication and having high durability.

With the foregoing object in view, the present invention provides an oilless antifriction bearing comprising an outer ring having an outer-ring race, an inner ring having an inner-ring race, a plurality of metallic rolling elements, and a plurality of polyethylene rolling elements, wherein the plurality of metallic rolling elements and the plurality of polyethylene rolling elements are arranged circumferentially alternately in the space between the outer-ring race of the outer ring and the inner ring race of the inner ring. In the oilless antifriction bearing, preferably, the outer-ring race is the inner circumference of a roller of a chain, the inner-ring race is the outer circumference of a bush of the chain, the metallic rolling elements are steel cylindrical rollers, the polyethylene rolling elements are polyethylene cylindrical rollers, and the steel cylindrical rollers and the polyethylene cylindrical rollers are arranged circumferentially alternately in the space between the roller and the bush. In a second embodiment, the outer-ring race is the inner circumference of a roller of a chain, the inner-ring race is the outer circumference of a pin of the chain, the metallic rolling elements are steel needle rollers, the polyethylene rolling elements are polyethylene needle rollers, and the steel needle rollers and the polyethylene needle rollers are arranged circumferentially alternately in the space between the bush and the pin.

The polyethylene rolling elements interposed between the metallic rolling elements prevent the direct contact between the metallic rolling elements. Since the polyethylene has a molecular construction having a relatively small number of branches and a relatively low intermolecular force, peripheral portions of the polyethylene rolling elements are caused to flow by friction to produce slippery flakes of the oriented polyethylene, and the flakes adhere to the surface of the metallic rolling elements for excellent lubricating effect.

Foreign matter that causes the rolling components of the oilless antifriction bearing to fail in rotating properly, such as particles produced by the abrasion of the unlubricating metallic rolling elements rolling along the outer and the inner-ring race and external dust particles that enter the oilless antifriction bearing, sink into the surfaces of the polyethylene rolling elements and the polyethylene flakes adhering in thin layers to the surfaces of the metallic rolling elements, so that the foreign matter is embedded in the polyethylene material and is removed from the metallic surfaces of the metallic rolling elements.

BRIEF DESCRIPTION OF THE DRAWINGS

The objects of the invention are more fully set forth hereinafter in conjunction with the drawings in which preferred embodiments of the invention are illustrated, as follows:

FIG. 1 is a sectional view of an oilless antifriction bearing in accordance with the present invention, showing the rolling elements in end elevation;

FIG. 2 is an exploded perspective view of an oilless antifriction bearing in a first embodiment according to the present invention;

DETAILED DESCRIPTION OF THE PREFERRED EMBODIMENTS

Figure 3:
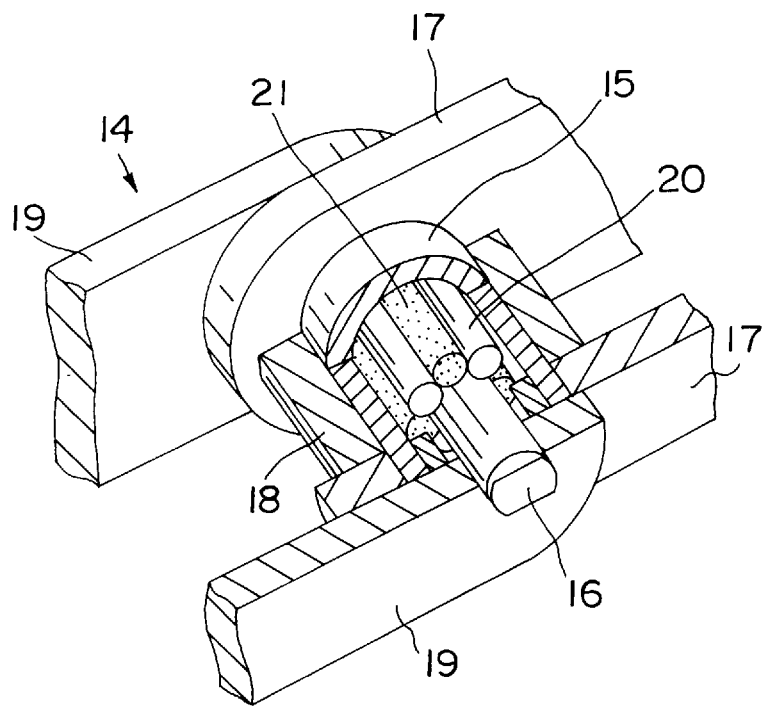
FIG. 3 is a perspective view of an oilless antifriction bearing in a second embodiment according to the present invention.

Referring to the drawings, FIG. 1 showing an oilless antifriction bearing in accordance with the present invention, a plurality of steel cylindrical rollers 3, i.e., metallic rolling elements, and a plurality of cylindrical rollers 4, i.e., polyethylene rolling elements, are arranged circumferentially alternately in the space between the outer-ring race of an outer ring 1 and the inner-ring race of an inner ring 2. When the outer ring 1 rotates, the steel cylindrical rollers 3 and the polyethylene cylindrical rollers 4 roll. The polyethylene cylindrical rollers 4 prevent the direct contact between the steel cylindrical rollers 3. Therefore, the flaking of the surface layers of the steel cylindrical rollers 3 due to direct contact between the steel cylindrical rollers 3 does not occur, and the excellent self-lubricating ability of the polyethylene forming the polyethylene cylindrical rollers 4 ensures the smooth rotation of the steel cylindrical rollers 3, and hence the oilless antifriction bearing is able to operate without requiring lubrication. The polyethylene cylindrical rollers 4 serve as cleaning elements that allow foreign matter including abrasive particles produced by the unlubricating steel cylindrical rollers 3 rolling along the outer-ring and the inner-ring race and dust particles that enter the oilless antifriction bearing to sink therein and become embedded to remove free foreign matter. Polyethylene flakes are produced by the abrasion of the polyethylene cylindrical rollers 4 during operation and adhere to the surface of the steel cylindrical rollers 3 in a thin polyethylene layer. The thin polyethylene layer allows the foreign matter to become embedded or entrapped therein to remove any free foreign matter. Preferably, the polyethylene cylindrical rollers 4 are formed of a high-density polyethylene in view of abrasion resistance.

Referring to FIG. 2 showing an oilless antifriction bearing in a first embodiment according to the present invention applied to a conveyor chain 5, a pair of inside link plates 6 are connected by a bush 11, a pair of outside link plates 7 are disposed contiguously with the outside surfaces of the inside link plates 6 so as to overlap the inside link plates 6, respectively, and a pin 8 is inserted in the bush 11 and through the inside link plates 6 and the outside link plates 7 to join together the inside link plates 6 and the outside link plate 7. Annular side plates 9 are put on the bush 11. A plurality of steel cylindrical rollers 12, i.e., metallic rolling elements, and a plurality of cylindrical rollers 13, i.e., polyethylene rolling elements, are arranged alternately around the bush 11 in the space between the annular side plates 9, and a hollow steel roller 10 is put on the sleeve 11 so as to cover the cylindrical rollers 12 and 13.

In this chain 5, the inner surface of the roller 10 serves as an outer-ring race, and the surface of the bush 11 serves as an inner-ring race. Since the roller 10 of the chain 5 is able to rotate without requiring lubrication owing to the self-lubricating ability of the polyethylene cylindrical rollers 13, the roller chain 5 does not need maintenance and need not be lubricated with grease or oil. Therefore, the chain 5 can be used as a conveyor chain for use in the industrial field which inhibits the use of lubricating oils, such as the food industry.

Figure 4:
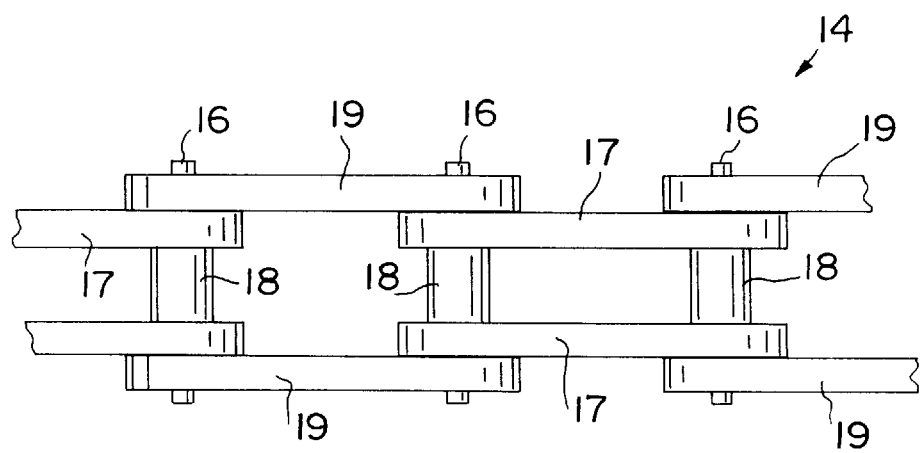
FIG. 4 is a fragmentary top view of a chain embodying the oilless friction bearing of FIG. 3.
Figure 5:
FIG. 5 is an enlarged view partially in section of a cylindrical roller used in the embodiment of FIGS. 1 and 2.
Figure 6:
FIG. 6 is an enlarged view partially in section of the needle rollers used in the embodiment of FIGS. 3 and 4.

Referring to FIGS. 3 and 4, showing an oilless antifriction bearing in a second embodiment of the present invention, the oilless antifriction bearing is interposed between a bush 15 and a pin 16 of a chain 14. A pair of inside link plates 17 are interconnected by the bush 15, and a hollow roller 18 is rotatably mounted on the bush 15. A pair of outside link plates 19 are disposed contiguously with the outside surfaces of the inside link plates 17, and the pin 16 is passed through the pair of outside link plates 19, the pair of inside link plates 17 and bush 15 to join together the same. A plurality of steel needle rollers 20, i.e., steel rolling elements, and a plurality of needle rollers 21, i.e., polyethylene rolling elements, are arranged circumferentially and alternately in the space between the bush 15 and the pin 16.

Since the steel needle rollers 20 and the polyethylene needle rollers 21 are arranged in the space between the bush 15 and the pin 16, the inside and the outside link plates are able to turn smoothly relative to each other and the self-lubricating ability and the cleaning function of the polyethylene needle rollers 21 enable the omission of lubrication and facilitate maintenance.

Although the foregoing embodiments have been described as employing the cylindrical rollers and the needle rollers, respectively, as the metallic rolling elements and the polyethylene rolling members, the metallic rolling elements and the resin rolling elements may be of any of shapes of various solids of revolution including spheres like the rolling elements of ball bearings and frustums of right circular cones like the rolling elements of taper roller bearings. When necessary, the oilless antifriction bearing of the present invention may be provided with rolling elements arranged in a plurality of rows in the space between the outside and the inside ring.

COMPARATIVE EXAMPLE 1

Oilless antifriction bearings of the construction shown in FIG. 2 in accordance with the present invention and antifriction bearings of a first and a second conventional construction were used for supporting the rollers of 10 ton-class conveyor chains of the RF type, respectively, for comparative tests.

In a conveyor chain in Example 1 incorporating the oilless antifriction bearings of the present invention, the hollow rollers having inner surfaces serving as outer-ring races were those made of a heat-treated tough hardening steel and having an outside diameter of 50.8 mm, and the bushes having outer surfaces serving as inner-ring races were those made of a heat-treated carburized steel and having an outside diameter of 20.1 mm.

Metallic rolling elements were 7.8 mm diameter rollers made of a heat-treated tough hardening steel rollers, side plates were annular plates made of a polyamide resin, and polyethylene rolling elements were 7.8 mm diameter rollers made of a high-density polyethylene.

In a conveyor chain in Comparative Example 1 incorporating first conventional antifriction bearings, the rollers were steel rollers of the same size as that of the rollers of the oilless antifriction bearings of the present invention.

COMPARATIVE EXAMPLE 2

In a conveyor chain in Comparative Example 2 incorporating second conventional antifriction bearings, the rollers were steel rollers and polyamide rollers of the same size as that of the rollers of the oilless antifriction bearings of the present invention and the steel rollers and the polyamide rollers were arranged alternately. The rollers were rotated at a surface speed of 24 m/min under a load of 70 kgf/cm$^2$ for rotation tests.

The rollers of the oilless antifriction bearings of the conveyor chain in Example 1 were still able to rotate satisfactorily after rotating about 700,000 turns, no heat was generated and no free steel particles were produced by abrasion. The steel rollers were coated with a polyethylene film and the tests proved that the conveyor chain in Example 1 can be used without lubrication.

The steel rollers of the first conventional antifriction bearings of the conveyor chain in Comparative Example 1 were locked after rotating about 9,000 turns, heat was generated and a large amount of steel particles was produced by abrasion. The steel rollers and the polyamide rollers, which were arranged alternately, of the second conventional antifriction bearings of the conveyor chain in Example 2, started to fail to rotate properly after rotating about 40,000 turns, heat was generated and some amount of steel particles was produced by abrasion. It was found that the conventional conveyor chains in Comparative Examples 1 and 2 need lubrication.

As is apparent from the foregoing description, the oilless antifriction bearing in accordance with the present invention is provided with metallic rolling elements and polyethylene rolling elements in an alternate arrangement. Therefore, the flaking of the surface layers of the metallic rolling elements attributable to direct contact between the metallic rolling elements does not occur under an unlubricated operating condition, and the self-lubricating ability of the polyethylene rolling elements ensures smooth rotation without requiring lubrication.

Foreign matter that causes the rolling components of the oilless antifriction bearing to fail in rotating properly, such as particles produced by the abrasion of the unlubricated metallic rolling elements rolling along the outer-ring and the inner-ring race and external dust particles that enter the oilless antifriction bearing, sink and are embedded into the surfaces of the polyethylene rolling elements and in the polyethylene flakes adhering in thin layers to the surfaces of the metallic rolling elements, so that free foreign matter is removed from the surfaces of the metallic rolling elements and the oilless antifriction bearing does not require maintenance.

Since the metallic rolling elements have a high strength to sustain loads, the oilless antifriction bearing is capable of supporting a large load. There is no possibility of seizure in the oilless antifriction bearing and, hence, the oilless antifriction bearing has high durability.

While a particular embodiment of the invention has been herein illustrated and described, it is not intended to limit the invention to such disclosures, but changes and modifications may be made therein and thereto within the scope of the following claims.

We claim:

1. A chain comprising a series of interconnected links, each link having a pair of parallel link plates, a bush extending between said link plates at each end of the parallel link plates, a hollow cylindrical chain roller mounted on each bush, and an oilless antifriction bearing positioned between said bush and said roller, said bush providing an inner ring race and said hollow roller providing an outer ring race of said bearing, and rolling elements in the annular space between said inner and outer ring races, said space operable to have free particles therein, the improvement wherein said rolling elements comprise metallic elements and polyethylene elements mounted in circumferential alternation within said annular space, said metallic rolling elements constituting load-bearing components between said inner and outer ring races, and being rotated by frictional engagement therebetween, said polyethylene elements comprising a polyethylene composition which allows particles to become embedded in said polyethylene composition which entraps any of said free particles and prevents their entry between said metallic rolling elements and said inner and outer ring races.

2. A chain according to claim 1 wherein each metallic rolling element is positioned between two adjoining polyethylene rolling elements.

3. A chain according to claim 1 wherein each polyethylene rolling element is positioned between two adjoining metallic rolling elements.

4. A chain according to claim 1 wherein said polyethylene rolling elements are of a composition affording creation of flakes when subjected to friction, said flakes being slippery and adhering to the surface of the metallic rolling elements.

5. A chain according to claim 4 wherein said polyethylene composition has a molecular construction having a small number of branches and a low intermolecular force, whereby peripheral portions of said composition flow by friction to create the flakes.

6. A chain according to claim 5 wherein said flakes comprise oriented polyethylene.

7. A chain comprising a series of interconnected links, each link having a pair of parallel link plates, a pin extending between said link plates at each end of the parallel link plates, a hollow cylindrical bush mounted on each pin and an oilless antifriction bearing positioned between said pin and said bush, said pin providing an inner ring race and said bush providing an outer ring race of said bearing, and rolling elements in the annular space between said inner and outer ring races, operable to include said space operable to have free particles therein, the improvement wherein said rolling elements comprise metallic elements and polyethylene elements mounted in circumferential alternation within said annular space, said metallic rolling elements constituting load-bearing components between said inner and outer ring races, and being rotated by frictional engagement therebetween, said polyethylene rolling elements comprising a polyethylene composition which allows particles to become embedded in said polyethylene composition which entraps any of said free particles and prevents their entry between said metallic rolling elements and said inner and outer ring races.

8. A chain according to claim 7 in which use of said bearing generates particles by abrasion of the metallic rolling elements, after said use, at least some of said entrapped particles being embedded in surfaces of said polyethylene rolling elements.

9. A chain according to claim 8 wherein said polyethylene rolling elements are of a composition affording creation of flakes when subjected to friction, said flakes being slippery, and adhering to the surface of the metallic rolling elements, said particles being embedded in said adhered flakes.

10. A chain according to claim 7 wherein each metallic rolling element is positioned between two adjoining polyethylene rolling elements.

11. A chain according to claim 7 wherein each polyethylene rolling element is positioned between two adjoining metallic rolling elements.

* * * * *